United States Patent
Evoy et al.

[11] Patent Number: 5,958,055
[45] Date of Patent: Sep. 28, 1999

[54] POWER MANAGEMENT SYSTEM FOR A COMPUTER

[75] Inventors: David R. Evoy, Tempe; Gary D. Hicok, Mesa, both of Ariz.; Laura E. Simmons, Corvallis, Oreg.

[73] Assignee: VLSI Technology, Inc., San Jose, Calif.

[21] Appl. No.: 08/717,478

[22] Filed: Sep. 20, 1996

[51] Int. Cl.$^6$ .................................................. G06F 11/00
[52] U.S. Cl. .................. 713/310; 713/320; 713/323; 713/324; 379/82; 379/93; 379/102
[58] Field of Search ............................. 395/750.03, 282, 395/750.04, 750.05, 750.06, 750.07, 750.02; 379/93, 413, 102, 98, 102.02, 82

[56] References Cited

U.S. PATENT DOCUMENTS

| | | | |
|---|---|---|---|
| 4,401,847 | 8/1983 | Schneider et al. | 179/1 H |
| 4,409,437 | 10/1983 | Horyu | 179/2 DP |
| 4,612,418 | 9/1986 | Takeda et al. | 179/81 R |
| 4,647,721 | 3/1987 | Busam et al. | 379/102 |
| 4,656,318 | 4/1987 | Noyes | 379/93 |
| 4,701,946 | 10/1987 | Oliva et al. | 379/98 |
| 4,951,309 | 8/1990 | Gross et al. | 379/98 |
| 4,991,199 | 2/1991 | Parekh et al. | 379/97 |
| 5,008,927 | 4/1991 | Weiss et al. | 379/98 |
| 5,258,721 | 11/1993 | Zanders | 328/138 |
| 5,390,350 | 2/1995 | Chung et al. | 395/150 |
| 5,471,522 | 11/1995 | Sells et al. | 379/97 |
| 5,566,339 | 10/1996 | Perholtz et al. | 395/750 |
| 5,586,333 | 12/1996 | Choi et al. | 395/750 |
| 5,588,054 | 12/1996 | Shin et al. | 379/413 |
| 5,596,628 | 1/1997 | Klein | 379/93 |
| 5,619,660 | 4/1997 | Scheer et al. | 395/282 |
| 5,666,539 | 9/1997 | Kenkel | 395/750.03 |

Primary Examiner—Ayaz R. Sheikh
Assistant Examiner—Eric S. Thlang
Attorney, Agent, or Firm—Martine Penilla & Kim, LLP

[57] ABSTRACT

An off-hook state of a telephone associated with a computer is used in order to disable the power management unit of the computer to prevent premature power shutdown while the telephone is being used. A power-managed computer system includes a bus system, and a central processing unit coupled to the bus system. The central processing unit has a normal power mode and a power saving mode. A telephony interface coupled to the bus system has a port for coupling to a telephone system network. A power management unit is also coupled to the bus system and is responsive to bus system activity and to indicia of telephony interface activity. The power management unit causes the central processing unit to be in a power saving mode when both bus system activity and telephony interface activity are less than a predetermined level of activity. Additionally, the power management unit maintains the central processing unit in a power mode greater than the power saving mode when either the bus system activity or the telephony interface activity is greater than the predetermined level of activity. An off-hook signal is directly sampled from the modem and provided to activity detection logic within the power management unit. Alternatively, modem interface logic interprets any number of signals provided by the modem to deliver an off-hook signal to the power management unit. Alternatively, telephone interface software includes an off-hook identifier that records the off-hook state of the telephone and an enablement/disablement register in the power management unit is either set or reset. System or user activity is also emulated in order to indicate to the power management unit that activity is occurring within the computer.

25 Claims, 6 Drawing Sheets

POWER MANAGEMENT SYSTEM FOR A COMPUTER

TECHNICAL FIELD

The present invention relates generally to a power management system for a computer. More specifically, the present invention relates to a power management system that prevents premature power shut down while performing telephony operations on a computer system.

BACKGROUND ART

With the increase in the flow of information and the popularity of computers, the computer is being used more extensively for processing external information. Currently, there is a trend towards using a computer as a telephone, a facsimile machine, and/or an answering machine. The computer typically implements telephone functionality by incorporating the analog circuitry found in a common telephone. Alternatively, a computer can use a modem in order to receive and transmit telephonic information.

For data transmission on a standard voice grade telephone line a modem may be employed to modulate data in a form suitable for transmission along the telephone line, and to demodulate data received from the telephone line in order to reproduce the data transmitted from a remote site for use in the computer. A modem modifies a digital signal for transmission over an analog medium. More specifically, it converts serial digital data for transmission over a carrier signal by changing the phase, frequency and amplitude of the signal.

The term "modem"(modulator-demodulator) normally refers to an auto-dialing, auto-answering modem that may be external or internal relative to the computer. An external modem is a stand alone device having one connector for coupling to the telephone lines and another connector for coupling to an I/O (input/output) port of the computer. The I/O port is commonly an RS-232 interface, which has become an industry standard for asynchronous serial communications in microcomputer devices. The RS-232 interface specifies a set of control signals and voltage levels (nominally +/−12 volts).

An internal modem may be built into the computer enclosure and may even be present on a circuit board or inside an integrated circuit. In either case, the modem and the computer exchange a number of control signals according to a specific protocol so as to condition the modem to accept incoming data calls or to place outgoing calls.

Whether or not a modem is used, if the computer is being used as a telephone, problems may develop if the computer also uses a power management system. With the advent "Green Machines" and power consumption concerns in desktop PC's, most computers now implement some form of power management. This power management is most frequently based upon the detection of "activity", where activity is commonly defined as some sort of interrupt and may include system and user activity. However, there is no simple method for identifying activity when the computer is being used only for its telephone functionality.

A conventional telephone may be a hand telephone set in which the hand set of the telephone is supported on a mounting (or body of the telephone). Typical among these telephones is the hang-up hand telephone set (also suspended-type handset telephone, bracket-type handset telephone) in which the mounting is attached to a vertical surface (such as a wall) and has a switch bracket from which the hand set is suspended. Typically, this switch bracket takes the form of, and is called, a "hook".

The user first initiates a telephone call or receives a telephone call by lifting the hand set from the hook. At this point, the telephone is considered to be in an "off-hook" state. When in this "off-hook" state the user may be dialing, on hold, or transmitting or receiving voice data. The concept of a telephone being in an "off-hook" state may also be applied to a telephone without a hook, a facsimile machine, an answering machine or the like. In other words, once the telephone or similar device picks up the line in response to an incoming call or picks up the line in order to transmit information the telephone is considered to be in "off-hook" state. During this off-hook state it would be undesirable for power to be cut off to the telephone device because that would terminate the transmission of voice or other data.

A power management system within a computer for conserving power typically uses a power management unit (PMU) to shut down power to the computer in stages if no activity is detected. There are a wide variety of actions that may constitute computer activity. By way of example, one such computer activity is user activity. User activities are actions produced by a person that indicates that a person is present at the computer and as such the computer should not be shut down. Actions such as keystrokes, moving the mouse, speaking, touching the computer screen, or other actions by a person may constitute user activity. This user activity is detected by the computer and by the power management unit which then will not shut down power to the computer when such activity is detected. It is common for a power management unit to shut down power to a computer after a predetermined time if no activity is detected. For example, a power management unit may begin shutting down power to a computer in stages if no activity is detected after two minutes. If activity is detected within those two minutes, power will not be shut down.

Computer activity also includes any kind of general system or CPU activity. In other words, the PMU will not shut down power to the computer if certain types of CPU activity are detected. For example, if the CPU is processing data, printing or performing other functions, the PMU will detect this activity and will not shut down power to the computer.

As mentioned above, if no activity is detected by the PMU, the PMU may begin to shut down and conserve power within the computer in stages. The stages of power shut down within a computer generally mean shutting down those processes that consume the most power first. For example, if the PMU determines that no activity has been present for a predetermined amount of time, in a first stage of shut down the PMU may turn off power to the computer monitor. As the computer monitor generally uses the most power within a computer it is more likely to be turned off first. However, for a laptop computer the monitor may not necessarily be powered down first because it may not be the most energy intensive part of that computer. In a second stage of power shut down the PMU may start to cut back on system activity. For example, the CPU system clock or clocks may be throttled back to a lower frequency. For example, a 75 MHz clock may be reduced to operating at a 25 MHz frequency. Next, the PMU may actually turn off the clock for periods of time. The clock may be turned off between keystrokes or between other indicators of user activity. Finally, the PMU may turn off the system clock all together.

In a third stage of power shut down the PMU may begin to turn off power to various sub-systems within the computer. For example, the PMU may shut down power to a printer interface card, a PCMIA card, or may stop the spinning of the hard disk, etc. Finally, the PMU may shut down all power to th computer completely by cutting off power available from a power source within the computer. In this fashion, it should be appreciated that the PMU may shut down power to a computer and its associated hardware in various stages. Any one of these various stages may be considered a reduced power or power saving mode of the computer or CPU.

A problem may occur if the computer is being used as a telephone and is currently enabled for power management. The computer may not recognize that there is activity ongoing, and may shut down power to the computer and to the telephone device while the user is engaged in a conversation. Likewise, if the computer is being used as a facsimile machine or as an answering machine or the like, if the power management system does not recognize this use as a traditional activity, power may also be shut down, thereby abruptly terminating those activities.

If the computer is being used as a telephone in voice mode, the central processing unit (CPU) is typically bypassed and may not show any activity, i.e., a separate analog, telephone circuit may be in use and the CPU will not be involved. If so, this analog telephone circuitry may not produce activity that can be detected by a power management unit (PMU), and the power management unit may shut down power to the computer. The PMU is circuitry typically within a chip set of a computer (i.e. chips that support the functionality of the CPU) that implements the power management system of the computer. If the power is shut down to the computer the telephone circuitry may cease to function and the telephone line may also be hung up.

Accordingly, for a computer with a power management system, a simple, cost effective method is desired for keeping power supplied to the computer while the computer is being used as a telephone.

SUMMARY OF THE INVENTION

Through a variety of apparatus and method embodiments, the present invention uses an off-hook state of a telephone associated with a computer in order to disable the power management unit of the computer to prevent premature power shutdown. Advantageously, the present invention performs this technique automatically, and transparently to the user. The user need not perform additional functions to prevent power shutdown while using the telephone. Also, the present invention makes use of conventional telephone signals to determine an off-hook state.

In one embodiment, a power-managed computer system with telephony capabilities includes a bus system, and a central processing unit coupled to the bus system. The central processing unit has a normal power mode and at least one power saving mode. Also included is a telephony interface coupled to the bus system that has a port for coupling the telephony interface to a telephone system network. A power management unit is also coupled to the bus system and is responsive to bus system activity and to indicia of telephony interface activity. The power management unit causes the central processing unit to be in a power saving mode when both bus system activity and telephony interface activity are less than a predetermined level of activity. Additionally, the power management unit maintains the central processing unit in a power mode greater than the power saving mode when at least one of the bus system activity and the telephony interface activity is greater than the predetermined level of activity.

In another embodiment, an off-hook signal is directly sampled from the modem and provided to activity detection logic within the power management unit. This off-hook signal from the modem indicates to the PMU that activity is occurring within the computer and that power should not be shut down. This off-hook signal may also be determined by the use of sensing logic in the telephony interface.

Another embodiment uses modem interface logic in order to interpret any number of signals provided by the modem. Through an interpretation of these modem signals, an off-hook state may be determined and an off-hook signal delivered to the PMU to prevent the shutdown of the computer.

One embodiment uses telephone interface software for managing the telephony interface. This software includes an off-hook identifier that records the off-hook state of the telephone. By sampling the value of this off-hook identifier, a signal can then be delivered to the PMU to prevent power shutdown. An enablement/disablement register in the PMU is either set or reset in order to prevent power shutdown.

In another embodiment, system or user activity is emulated in order to indicate to the PMU that activity is occurring within the computer. Thus, through the use of various embodiments, the present invention is able to prevent premature power shutdown in a computer system while a user is making use of telephone capabilities of that system.

BRIEF DESCRIPTION OF THE DRAWINGS

The invention, together with further advantages thereof, may best be understood by reference to the following description taken in conjunction with the accompanying drawings in which.

DISCLOSURE OF THE INVENTION

It is important that when a computer is also being used as a telephone that power to the computer or to the telephone itself is not cut off while the telephone is in an off-hook state. The present invention uses the knowledge that the telephone is off-hook in order to produce or emulate activity that may be identified by the computer. This activity may be used by the computer to prevent the computer from prematurely terminating the telephone conversation. Additionally, the embodiments described below are able to monitor a telephone connection and to restore power to a computer and an associated telephone when a call is received. Such a technique is useful if the power to a computer has already been shut down, yet an incoming communication is received.

Figure 1:
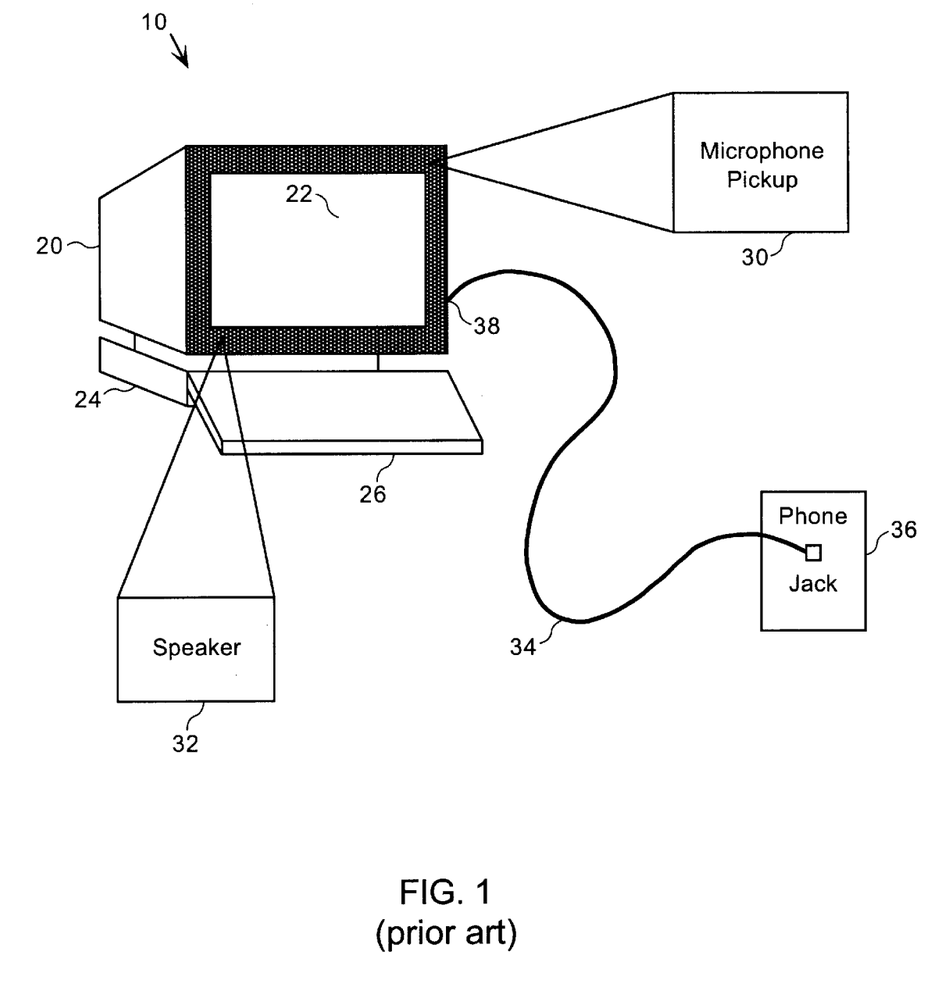
FIG. 1 illustrates a computer that also has the ability to function as a telephone.

FIG. 1 shows at 10 a computer that may also be used as a telephone. The computer 20 has a monitor 22, a hardware unit 24 and a keyboard 26. Connected to the computer at a telephone jack 38 is an analog telephone signal line 34 that connects externally to other devices via a telephone jack 36 that may be installed in a wall, for example. In order for the computer to also function as a telephone the computer also includes a microphone pickup 30 and a speaker 32. The computer also has telephone circuitry 40 (FIG. 2) to enable the computer to function as a telephone. In this fashion, when the computer functions as a telephone the user speaks into the microphone 30 and is able to hear an incoming transmission through the speaker 32. The computer preferably also functions as a facsimile or answering machine. The computer also preferably has specialized telephone software that allows the user to initiate a telephone call, receive a telephone call, terminate a telephone call or perform logging of a telephone call. A software program known as TAPI (Telephone APplications Interface) is available from Microsoft Corporation and is preferably used to perform this telephone functionality. However, when the computer is being used exclusively as a telephone it may be that no identifiable activity is generated, possibly causing the PMU to shut down the computer.

Figure 2:
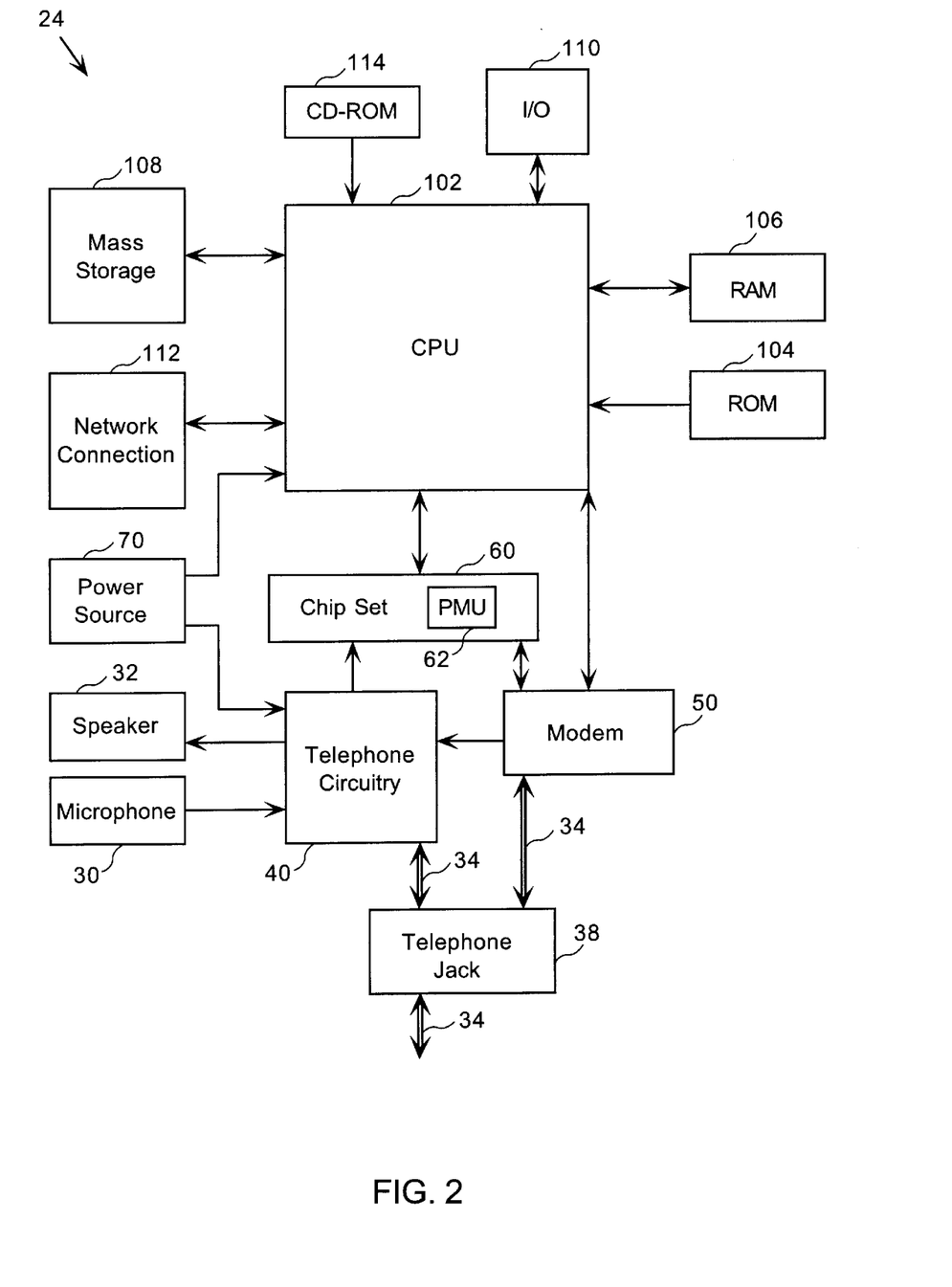
FIG. 2 is a block diagram of the computer of FIG. 1.

FIG. 2 at 24 shows the hardware unit of a computer that includes hardware for preventing the shut down of the computer while it is being used as a telephone according to one embodiment of the present invention. A telephone analog signal 34 is received at the telephone jack 38 and this signal 34 is passed through to telephone circuitry 40 or to a modem 50. The telephone circuitry (telephony interface) 40 includes conventional analog circuitry for allowing the telephone to function and controls operation of the speaker 32 and a microphone 30. The telephone circuitry 40 also includes circuits for determining if the telephone is in an off-hook state as will be explained more further below with reference to FIGS. 3 and 4. The telephone analog signal 34 is received in one embodiment from a telephone system network.

The telephone circuitry is also capable of receiving modem signals from the modem 50 in order to determine if the telephone is in an off-hook state. The telephone circuitry also communicates with a chip set 60 in order to enable or disable the PMU within the chip set, or to transmit an off-hook signal to the PMU to indicate that activity is occurring.

The modem 50 receives the analog telephone signal 34 and demodulates this signal and pass it to either the chip set 60 or the CPU 102. Likewise, the modem receives digital information from the chip set or the CPU and modulates this data and passes it back along the telephone line 34 to an external device. The chip set 60 forms a major portion of the functionality of the computer. It is contemplated that a wide variety of chip sets may be used with the present invention. By way of example, the "LINKS" chip set available from VLSI Technology, Inc. may be used with the present invention. Also contained within the chip set 60 is a power management unit (PMU) 62. The chip set is also in bi-directional communication with the CPU 102. The chip set 60 also communicates with other hardware devices illustrated symbolically in FIG. 2, although these communication lines are not shown.

The computer also contains a power source 70 that in general provides power to the overall computer and to the CPU 102, and also provides power to the telephone circuitry 40 in order to enable the telephone functionality of this device.

The computer includes a central processing unit 102 (CPU) that is coupled to memory devices including read only memory 104 (ROM) and random access memory 106 (RAM). As is well known in the art, ROM 104 acts to transfer data and instructions uni-directionally to the CPU and RAM 106 is used typically to transfer data and instructions in a bi-directional manner. A mass memory device 108 is also coupled bi-directionally to CPU 102 and provides additional data storage capacity. The mass memory device 108 may be used to store programs, data and the like and may take the form of a magnetic or paper tape reader or some other well-known device. It will be appreciated that the information retained within the mass memory device 108, may, in appropriate cases, be incorporated in standard fashion as part of RAM 106 as virtual memory. A specific mass storage device such as a CD-ROM 114 may also pass data uni-directionally to the CPU.

CPU 102 is also coupled to one or more input/output devices 110 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally can be coupled to a computer or telecommunications network using a network connection as shown generally at 112. With such a network connection, it is contemplated that the CPU might receive information from the network, or might output information to the network in the course of performing the above-described method steps. The telephone analog signal 34 may also be received by the computer through this network connection 112. The above-described devices and materials will be familiar to those of skill in the computer hardware and software arts. Typically, the CPU will be interconnected with the above devices and peripherals via a bus system. This bus system may include a data bus, address bus, and various control lines suitable for controlling these devices. The bus system may take any suitable form, as will be appreciated by those of skill in the art.

Figure 3:
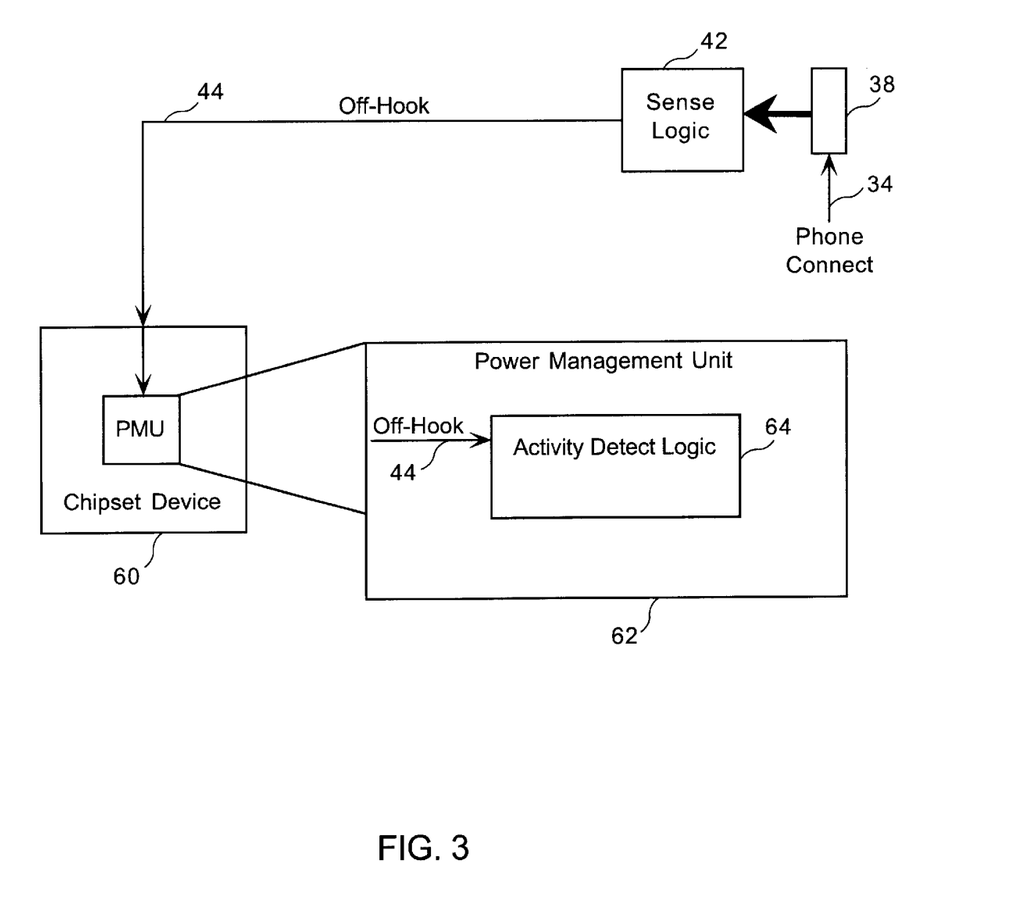
FIG. 3 illustrates a power management technique for a computer that may also be used as a telephone according to a first embodiment of the invention.

FIG. 3 illustrates a first embodiment of the invention in which an off-hook signal is developed and communicated to the power management unit to indicate that activity is occurring within the computer and that power should not be shut down. Shown is a telephone signal line 34 that passes into the computer via a telephone jack 38. Sensing logic 42 senses the state of the telephone line and produces an off-hook signal 44 that is passed to the PMU 62 within the chip set 60. This off-hook signal 44 is presented as computer activity to the activity detection logic 4. In this fashion, when the telephone is off-hook, i.e. in use, the activity detection logic perceives that computer activity is occurring and the PMU will not shut down power to the computer.

The sensing logic 42 is included within the telephone circuitry 40. The sensing logic 42 may include a combination of analog and digital circuitry that is able to determine if the elephone is off-hook by sensing the status of the telephone line. As will be appreciated by hose of skill in the art, characteristics of the telephone line such as an incoming ring or changing voltage levels may be used to develop an off-hook signal 44. When the status of the telephone line is such that the telephone is in use an off-hook signal 44 will be developed and will be passed to the PMU.

In another aspect of this first embodiment the off-hook signal 44 is sampled directly. For example, if the data communications are using the modem 50 of the computer, then the modem itself outputs an off-hook signal 44 that indicates that the telephone or other device is in use. As such, no sensing logic is required, but this off-hook signal available directly from the modem is passed into the PMU. The modem may be present external to the computer, may be a card that plugs into the motherboard of the computer, may be a chip present on the motherboard or may actually be incorporated inside of a chip such as the chip set 60. In either situation, this off-hook signal available from the modem may be connected by one of skill in the art directly to the PMU. For a modem not present inside the chip set, it would be preferable to use a dedicated pin on the chip set in order to receive this off-hook signal 44 and to pass the off-hook signal into the PMU within the chip set.

Figure 4:
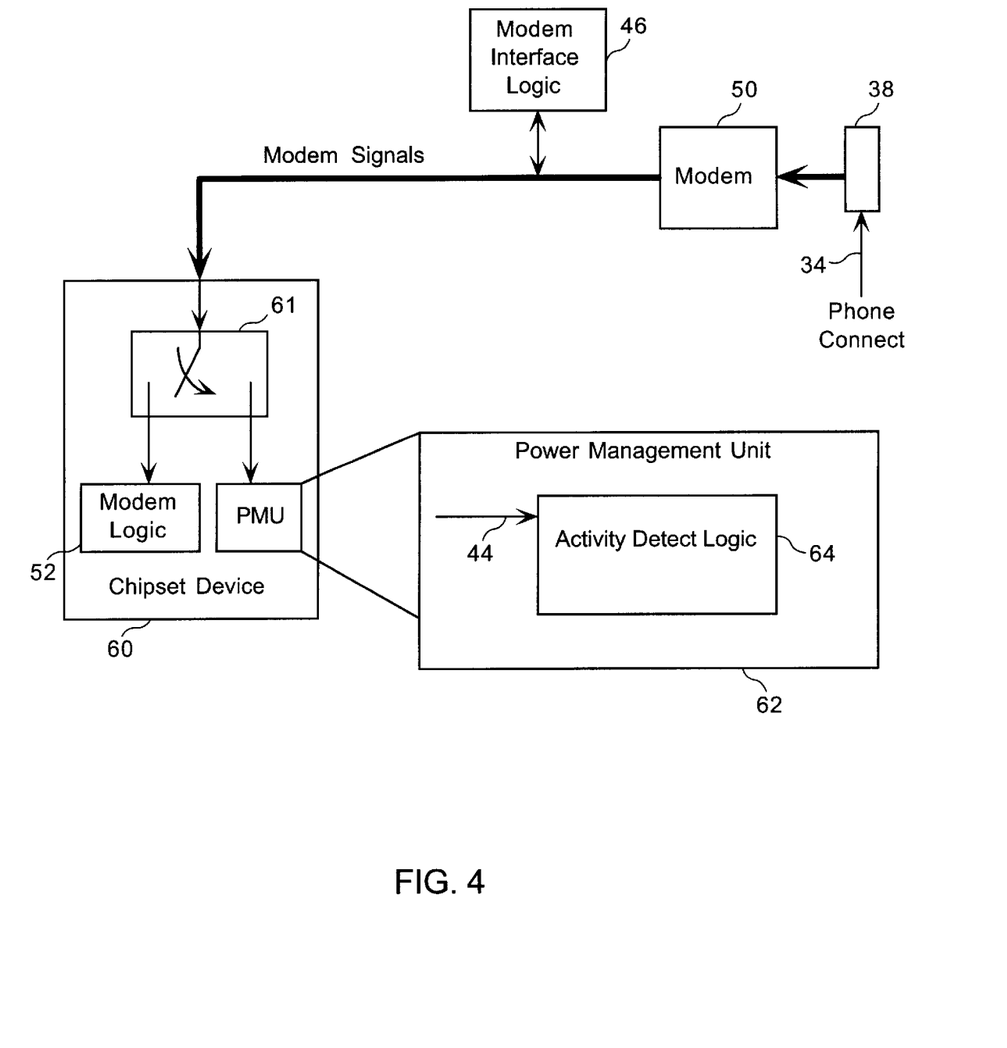
FIG. 4 illustrates a power management technique for a computer that may also be used as a telephone according to a second embodiment of the invention.

FIG. 4 illustrates a second embodiment of the present invention in which an off-hook state is inferred by detecting various modem signals available from the modem. This second embodiment involves extra hardware, but does require an additional pin of the chip set. This design would be more advantageous as pins are always at a premium. To communicate an off-hook signal to the PMU, this embodiment makes use of existing data and control lines. The chip set may already have pins and internal lines that are dedicated for use with an external modem. These existing modem lines may serve a dual function: normal modem function when required, and activity detection when there is no data transfer from computer to computer.

Shown in FIG. 4 is an analog telephone line 34 that connects to a computer via a telephone jack 38. This telephone signal passes into a modem 50 that transmits modem signals to a chip set 60. Modem interface logic 46 is arranged to sample various modem signals and may also transmit an off-hook signal to the chip set. Contained within the chip set 60 is a switch 61, modem logic 52 and a PMU 62.

When data transmission is occurring the modem 50 will make available various modem signals that are in addition to the serial digital data signals that the modem outputs. These modem signals are standard RS-232 signals and includes the signals "ring indicator", "request assent", "clear assent" and "data carrier detect". As will be appreciated by those of skill in the art, the status of the telephone line may be determined by sampling these four modem signals and others in order to determine whether the telephone line is off-hook or not. By way of example, a state machine may be used to determine an off-hook state.

The modem interface logic 46 is arranged to sample these modem signals and to output an off-hook signal 44 when the modem interface logic determines that the telephone is in an off-hook state.

When the modem 50 is transmitting data to the chip set 60 the switch 61 directs this data to the modem logic 52. However, when activity needs to be directed to the PMU to prevent power shut down, the switch 61 is activated to pass the off-hook signal 44 from the modem interface logic 46 to the activity detection logic 64 within the PMU. In this fashion, when the modem is in use the modem interface logic develops an off-hook signal that is passed to the PMU at the appropriate time in order to prevent the PMU from shutting down power to the computer. This off-hook signal 44 is presented to the activity detection logic as computer activity.

It should also be appreciated that the modem 50 may be contained entirely within the chip set 60. In other words, the logic and functionality of the modem would be implemented as part of the chip set. In this case, the telephone signal 44 would be presented to an analog pin on the chip set that would then pass this signal internally to the modem. In this case, the modem interface logic 46 would also be implemented within the chip set in order to sample the modem signals available from the modem.

Figure 5:
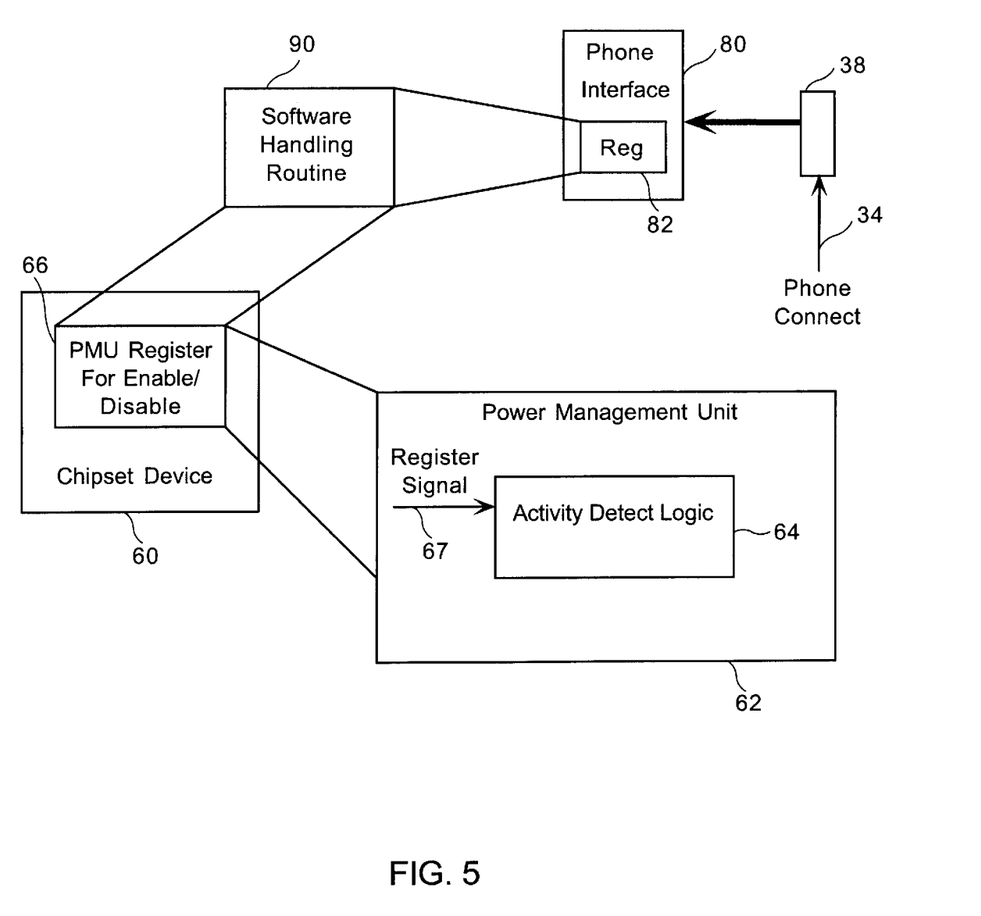
FIG. 5 illustrates a power management technique for a computer that may also be used as a telephone according to a third embodiment of the invention.

FIG. 5 illustrates a third embodiment of the present invention in which software is used to keep track of the status of the telephone line. This third embodiment is primarily a software solution. The telephone application software used to manage the telephone calls may also be used to track the status of the telephone line as to whether the call is outgoing or incoming, or is data or voice. This telephone software assists in receiving calls, placing calls, monitoring calls, etc. As such, this software knows when the telephone is off-hook. And the software is able to keep track of this off-hook state via an internal variable, a register or the like. When the telephone is off-hook, a separate software routine handler sets a bit in a register that prevents the power management unit from performing. This control bit may also be cleared by the software when the call is terminated.

Shown in FIG. 5 is an analog telephone signal 34 that connects to a computer via a telephone jack 38. This telephone signal 34 is accessible and is able to be controlled via telephone interface software 80 and its corresponding logic. Accessible by this telephone software 80 is a register 82 that keeps track of whether the telephone line is off-hook or not. The telephone software transmits this off-hook information periodically to the PMU in order to generate computer activity to prevent the PMU from shutting the computer down. Specifically, a software handling routine 90 reads register 82 and is capable of setting a bit in the PMU register 66. This register 66 operates to either enable or disable the power shut down feature of the PMU. For example, if the telephone line is off-hook, the PMU register has a bit set that indicates that even though the PMU may still be operational, it is disabled for performing power shut down of the computer. And when the telephone call has been completed, the software handling routine will reset this bit, thus permitting the PMU to perform power shut down if necessary. This register 66 also passes this set bit as a register signal 67 to the activity detect logic 64. In an alternative aspect of this third embodiment, instead of setting a bit in the PMU register, the software handling routine operates to turn off the PMU completely. Once the PMU has been turned off, it would be incapable of shutting down power in the computer.

Figure 6:
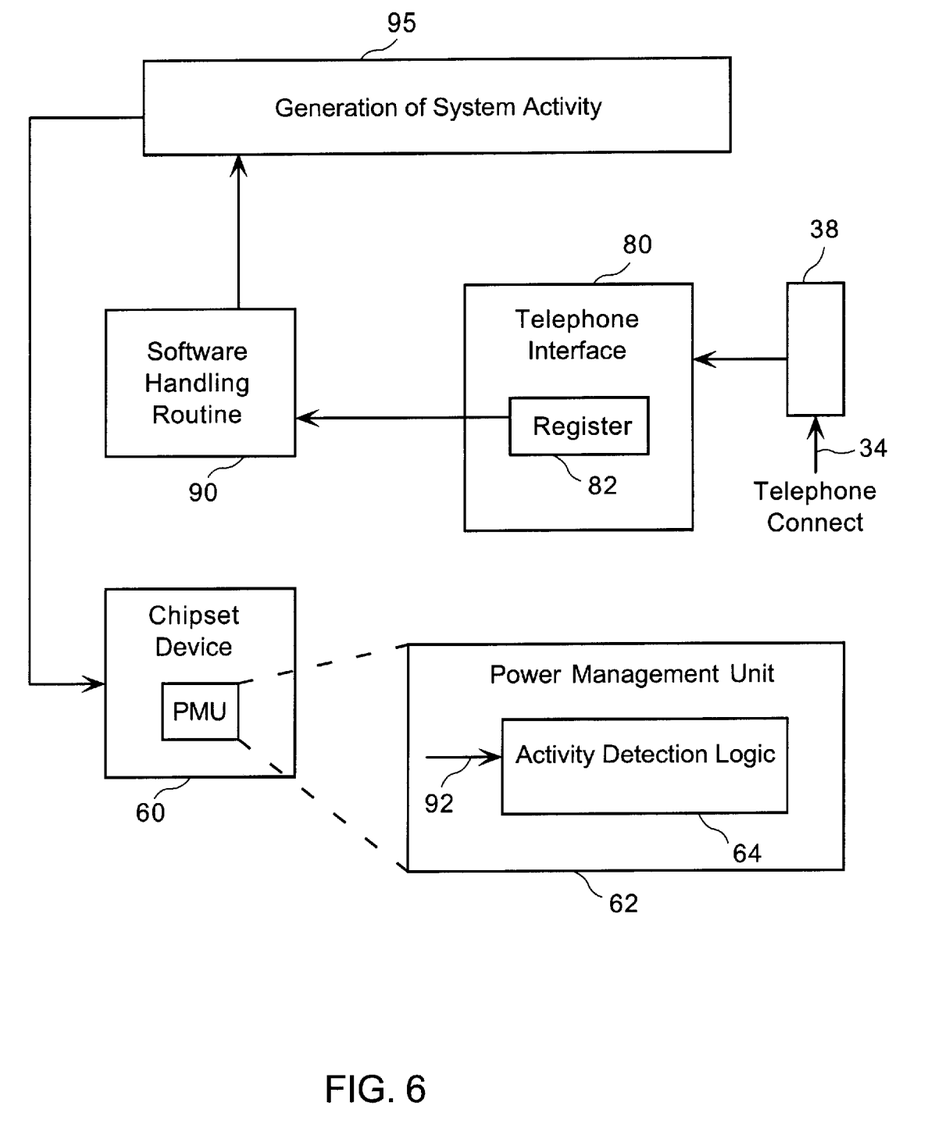
FIG. 6 illustrates a power management technique for a computer that may also be used as a telephone according to a fourth embodiment of the invention.

FIG. 6 illustrates a fourth embodiment of the present invention in which a software handling routine emulates computer activity in order to prevent the PMU from shutting down power to the computer. In this figure an analog telephone signal 34 connects to a computer via a telephone jack 38. Telephone interface software 80 processes this signal and sets a register 82 to indicate that the telephone is off-hook. When the telephone is off-hook, and as required, a software handling routine 90 generates computer activity. This generation of computer activity 95 may be true computer activity or it may be an emulation of computer activity. By producing such computer activity, the PMU will detect this activity and will not shut down the computer. This generation of system activity 95 will be detected by the chip set 60 and passed on as a signal 92 to the activity detection logic 64 within the PMU.

The generation or emulation of computer activity may involve any of the system or user activities discussed above. For example, the software handling routine may simulate that a keystroke has occurred or that the user has moved the mouse, etc. Or the routine may perform a status check of a disk, send an interrupt to the CPU, or perform or emulate any other system activity that prevents the PMU from turning off power to the computer. For example, if the PMU has been directed to turn off power after two minutes of no computer activity, the routine performs or emulates computer activity every two minutes or less to prevent power shut down.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure for a variety of these machines will appear from the description given above.

In addition, the present invention further relates to computer readable media that include program instructions for performing various computer-implemented operations. The media and program instructions may be those specially designed and constructed for the purposes of the present invention, or they may be of the kind well known and available to those having skill in the computer software arts. Examples of computer readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code and files containing higher level code.

Although the foregoing invention has been described in some detail for purposes of clarity of understanding, it will be apparent that certain changes and modifications may be practiced within the scope of the appended claims. For instance, the present invention is applicable to any telephone-like communications that are received by a computer. And the telephone itself may be a conventional telephone, may be a cellular telephone or any device such as a facsimile machine, answering machine or the like that uses a telephone signal. The invention may also be practiced with any variety of power management unit that operates to shut down power to a computer if no computer activity is detected. Therefore, the described embodiments should be taken as illustrative and not restrictive, and the invention should not be limited to the details given herein but should be defined by the following claims and their full scope of equivalents.

We claim:

1. A power-managed computer system with telephony capabilities comprising:

a bus system;

a central processing unit coupled to said bus system, said central processing unit having a normal power mode and at least one power saving mode;

a telephony interface coupled to said bus system for transmitting or receiving a telephonic signal, said telephony interface including a port for coupling said telephony interface to a telephone system network;

a power management unit coupled to said bus system and responsive to bus system activity and to telephony interface activity, said power management unit being operative to cause said central processing unit to be in said power saving mode when both said bus system activity and said telephony interface activity are less than a predetermined level of activity and said power management unit being operative to maintain said central processing unit in a power mode greater than said power saving mode when at least one of said bus system activity and said telephony interface activity is greater than said predetermined level of activity;

telephone circuitry for allowing said computer system to function as a telephone and capable of transmitting or receiving a telephonic signal;

telephone interface software for managing said telephone circuitry, said telephone interface software providing an off-hook identifier to indicate said telephony interface activity to said activity detection logic in said power management unit such that said activity detection logic interprets said off-hook signal as activity within said computer and prevents said computer system from being placed in a reduced power mode; and an enablement register in said power management unit capable of being arranged to disable said power management unit from shutting down power to said computer.

2. A power-managed computer system as recited in claim 1 wherein said telephony interface includes a modem for transmitting or receiving said telephonic signal, said modem providing an off-hook signal arranged to indicate said telephony interface activity.

3. A power-managed computer system as recited in claim 2 wherein said power management unit includes activity detection logic for detecting said bus system activity and said telephony interface activity within said computer system, and wherein said telephony interface is arranged to provide said off-hook signal to said activity detection logic in said power management unit such that said activity detection logic interprets said off-hook signal as activity within said computer system.

4. A power-managed computer system as recited in claim 1 further comprising:

activity detection logic in said power management unit for detecting said bus system activity and said telephony interface activity within said computer system; and sensing logic for determining the status of said telephonic signal and for generating an off-hook signal arranged to indicate said telephony interface activity to said activity detection logic in said power management unit such that said activity detection logic interprets said off-hook signal as activity within said computer and prevents said computer system from being placed in a reduced power mode.

5. A power-managed computer system as recited in claim 1 further comprising:

activity detection logic in said power management unit for detecting said bus system activity and said telephony interface activity within said computer system;

a modem for transmitting or receiving said telephonic signal; and telephone circuitry that includes modem interface logic, whereby said modem interface logic is arranged to interpret the status of a plurality of modem signals provided by said modem in order to generate an off-hook signal arranged to indicate said telephony interface activity to said activity detection logic in said power management unit such that said activity detection logic interprets said off-hook signal as activity within said computer and prevents said computer system from being placed in a reduced power mode.

6. A power-managed computer system as recited in claim 1 wherein said bus system activity is produced by emulating system or user activity in order to maintain said central processing unit in a power mode greater than said power saving mode.

7. A power-managed computer system with telephony capabilities comprising:

a central processing unit having a normal power mode and a reduced power mode, said central processing unit being a contributor to general system activity;

at least one peripheral coupled to said central processing unit and contributing to said general system activity, said at least one peripheral having a normal power mode and a reduced power mode;

a telephony interface for transmitting or receiving a telephonic signal, said telephony interface including a port for coupling said telephony interface to a telephone system network;

a power management means for determining telephony interface activity and for monitoring said general system activity, said power management means being operative to put at least one of said central processing unit and said peripheral in a reduced power mode in the absence of both a predetermined level of telephony interface activity and a predetermined level of general system activity, and said power management means being operative to return said at least one of said central processing unit and said peripheral to its normal power mode when at least one of said telephony interface activity and said general system activity is greater than respective said predetermined levels of activity;

telephone circuitry for allowing said computer system to function as a telephone and capable of transmitting or receiving a telephonic signal;

telephone interface software for managing said telephone circuitry, said telephone interface software providing an off-hook identifier to indicate said telephony interface activity to said activity detection logic in said power management means such that said activity detection logic interprets said off-hook signal as activity within said computer and prevents said computer system from being placed in a reduced power mode; and an enablement register in said power management means capable of being arranged to disable said power management means from shutting down power to said computer.

8. A power-managed computer system as recited in claim 7 wherein said telephony interface includes a modem for transmitting or receiving said telephonic signal, said modem providing an off-hook signal arranged to indicate said telephony interface activity.

9. A power-managed computer system as recited in claim 8 wherein said power management means includes activity detection logic for detecting said general system activity and said telephony interface activity within said computer system, and wherein said telephony interface is arranged to provide said off-hook signal to said activity detection logic in said power management means such that said activity detection logic interprets said off-hook signal as activity within said computer system.

10. A power-managed computer system as recited in claim 7 further comprising:

activity detection logic in said power management means for detecting said general system activity and said telephony interface activity within said computer system; and sensing logic for determining the status of said telephonic signal and for generating an off-hook signal arranged to indicate said telephony interface activity to said activity detection logic in said power management means such that said activity detection logic interprets said off-hook signal as activity within said computer and prevents said computer system from being placed in a reduced power mode.

11. A power-managed computer system as recited in claim 7 further comprising:

activity detection logic in said power management means for detecting said general system activity and said telephony interface activity within said computer system;

a modem for transmitting or receiving said telephonic signal; and telephone circuitry that includes modem interface logic, whereby said modem interface logic is arranged to interpret the status of a plurality of modem signals provided by said modem in order to generate an off-hook signal arranged to indicate said telephony interface activity to said activity detection logic in said power management means such that said activity detection logic interprets said off-hook signal as activity within said computer and prevents said computer system from being placed in a reduced power mode.

12. A power-managed computer system as recited in claim 7 wherein said general system activity is produced by emulating system or user activity in order to maintain said central processing unit in a power mode greater than said reduced power mode.

13. A method for managing power in a computer system having general system activity and telephony interface activity, said method comprising the steps of:

monitoring both general system activity and telephony interface activity of said computer system running in a normal power mode;

determining a level of general system activity and a level of telephony interface activity by sampling an off-hook identifier;

placing said computer system in a reduced power mode in the absence of both a predetermined level of telephony interface activity and a predetermined level of general system activity as determined by said monitoring, whereby said computer system is prevented from being placed in a reduced power mode when said telephony interface activity is greater than said predetermined level of telephony interface activity, wherein said computer system includes:

telephone circuitry for allowing said computer system to function as a telephone and capable of transmitting or receiving a telephonic signal, and telephone interface software for managing said telephone circuitry, said telephone interface software providing said off-hook identifier, and a power management unit for shutting down power to said computer system after a predetermined amount of time; and setting an enablement register in said power management unit in order to disable said power management unit from shutting down power to said computer.

14. A method as recited in claim 13 wherein said computer system includes a modem for transmitting or receiving a telephonic signal, and said determining step includes sampling an off-hook signal provided by said modem.

15. A method as recited in claim 14 wherein said computer system further includes a power management unit for shutting down power to said computer system after a predetermined amount of time, said power management unit including activity detection logic for detecting general system activity and telephony interface activity within said computer system, and wherein said computer system is prevented from being placed in a reduced power mode by providing said off-hook signal to said activity detection logic in said power management unit such that said activity detection logic interprets said off-hook signal as activity within said computer system.

16. A method as recited in claim 13 wherein said computer system includes sensing logic, and said determining step includes sensing the status of a telephonic signal using said sensing logic.

17. A method as recited in claim 16 wherein said computer system further includes a power management unit for shutting down power to said computer system after a predetermined amount of time, said power management unit including activity detection logic for detecting general system activity and telephony interface activity within said computer system, said method further includes the steps of:

generating an off-hook signal from said sensing logic, and providing said off-hook signal to said activity detection logic in said power management unit such that said activity detection logic interprets said off-hook signal as activity within said computer and prevents said computer system from being placed in a reduced power mode.

18. A method as recited in claim 13 wherein said computer system includes a modem for transmitting or receiving a telephonic signal, telephone circuitry that includes modem interface logic, and said determining step includes interpreting the status of a plurality of modem signals provided by said modem using said modem interface logic.

19. A method as recited in claim 18 wherein said computer system further includes a power management unit for shutting down power to said computer system after a predetermined amount of time, said power management unit including activity detection logic for detecting general system activity and telephony interface activity within said computer system, said method further including the steps of:

generating an off-hook signal from said modem interface logic; and providing said off-hook signal to said activity detection logic in said power management unit such that said activity detection logic interprets said off-hook signal as activity within said computer.

20. A method as recited in claim 13 wherein said computer system further includes a power management unit for shutting down power to said computer system after a predetermined amount of time, said method further comprising the step of directing said telephone interface software to disable said power management unit.

21. A method as recited in claim 13 further including the step of emulating general system activity, whereby said computer system is prevented from being placed in a reduced power mode.

22. A method for preventing the shutting down of power within a computer system, said computer system having telephone circuitry for allowing said computer system to function as a telephone and capable of transmitting or receiving a telephonic signal, a power source providing power for said computer system and said telephone circuitry, and a power management unit for shutting down the power to said computer system after a predetermined amount of time, said power management unit including activity detection logic for detecting activity within said computer system, the method comprising the steps of:

enabling said power management unit of said computer system such that if no activity is detected by said activity detection logic said power management unit will shut down power to said computer system;

enabling said telephone circuitry such that said computer system functions as a telephone, said telephone circuitry being in an off-hook state when said computer system functions as a telephone;

determining whether said telephone circuitry is in an off-hook state; and wherein when it is determined that said telephone circuitry is in an off-hook state, preventing said power management unit from shutting down power to said computer system, such that said power source still provides power to said computer system and said telephone circuitry while said telephone circuitry is in an off-hook state.

23. A power-managed computer system with telephony capabilities comprising:

a bus system;

a central processing unit coupled to said bus system, said central processing unit having a normal power mode and at least one power saving mode;

a telephony interface coupled to said bus system for transmitting or receiving a telephonic signal, said telephony interface including a port for coupling said telephony interface to a telephone system network, said telephony interface includes a modem for transmitting or receiving said telephonic signal, such that said modem provides an off-hook signal that is arranged to indicate said telephony interface activity; and a power management unit coupled to said bus system and responsive to bus system activity and to telephony interface activity, said power management unit being operative to cause said central processing unit to be in said power saving mode when both said bus system activity and said telephony interface activity are less than a predetermined level of activity and said power management unit being operative to maintain said central processing unit in a power mode greater than said power saving mode when at least one of said bus system activity and said telephony interface activity is greater than said predetermined level of activity.

24. A power-managed computer system as recited in claim 23 wherein said power management unit includes activity detection logic for detecting said bus system activity and said telephony interface activity within said computer system, and wherein said telephony interface is arranged to provide said off-hook signal to said activity detection logic in said power management unit such that said activity detection logic interprets said off-hook signal as activity within said computer system.

25. A power-managed computer system with telephony capabilities comprising:

a bus system;

a central processing unit coupled to said bus system, said central processing unit having a normal power mode and at least one power saving mode;

a telephony interface coupled to said bus system for transmitting or receiving a telephonic signal, said telephony interface including a port for coupling said telephony interface to a telephone system network;

a power management unit coupled to said bus system and responsive to bus system activity and to telephony interface activity, said power management unit being operative to cause said central processing unit to be in said power saving mode when both said bus system activity and said telephony interface activity are less than a predetermined level of activity and said power management unit being operative to maintain said central processing unit in a power mode greater than said power saving mode when at least one of said bus system activity and said telephony interface activity is greater than said predetermined level of activity;

activity detection logic in said power management unit for detecting said bus system activity and said telephony interface activity within said computer system; and sensing logic for determining the status of said telephonic signal and for generating an off-hook signal arranged to indicate said telephony interface activity to said activity detection logic in said power management unit such that said activity detection logic interprets said off-hook signal as activity within said computer and prevents said computer system from being placed in a reduced power mode.

* * * * *